US005092719A

United States Patent [19]

Zsiger

[11] Patent Number: 5,092,719

[45] Date of Patent: Mar. 3, 1992

[54] AUGER BIT

[76] Inventor: Attila Zsiger, Ságvári u. 15, H-2628 Szob, Hungary

[21] Appl. No.: 459,706

[22] PCT Filed: Jun. 29, 1988

[86] PCT No.: PCT/HU88/00045

§ 371 Date: Jan. 3, 1990

§ 102(e) Date: Jan. 3, 1990

[87] PCT Pub. No.: WO89/00097

PCT Pub. Date: Jan. 12, 1989

[30] Foreign Application Priority Data

Jun. 29, 1987 [HU] Hungary ............................. 2926/87

[51] Int. Cl.[5] ............................................ B23B 51/02

[52] U.S. Cl. .................................... 408/213; 408/226; 408/230

[58] Field of Search ............... 408/213, 227, 290, 226, 408/214

[56] References Cited

U.S. PATENT DOCUMENTS 877,831 1/1908 Creedon .......................... 408/230 X
2,358,077 9/1944 Koett .................................. 408/213
4,852,670 8/1989 Peetz et al. ..................... 408/226 X

FOREIGN PATENT DOCUMENTS 17998 5/1882 Fed. Rep. of Germany .
479928 5/1916 France .
686872 9/1979 U.S.S.R. .

*Primary Examiner*—Steven C. Bishop
*Attorney, Agent, or Firm*—Schweitzer Cornman & Gross

[57] ABSTRACT

The subject of the invention is wood industrial drilling cutting tool for preparing holes mainly in wood and in the like sort, which holes can be used as blind holes for fastening together wooden constructions, furniture, toys etc. and which has one or more swarf-leading surface which is situated behind one or more main cutting edge which is continuously rising and reach the backside of the drilling body.

The essence of the invention is that the swarf-leading surface is concave-courved seeing from the direction of bore rod, further, as a continuation of the swarf-leading surfaces a swarf-lifting spiral is formed on the bore rod.

7 Claims, 2 Drawing Sheets

AUGER BIT

FIELD OF THE INVENTION

The present invention relates to an auger bit for drilling wood, such as for preparing holes which can be used as blind- or through holes for fastening together wooden structures, such as furniture, toys, etc.

BACKGROUND OF THE INVENTION

Drills suitable for producing blind- or through holes have been known for a long time in the woodworking industry, but those known drills are suitable for drilling holes only of low depths and the surface quality of the walls of the hole is also not satisfactory. The technical book "Faforgácsoló Szerszámok" (Müszaki Kiadó publisher, Hungary, 1984) describes drills which are suitable for producing holes of such kind.

The disadvantage of the known wood augers is generally that the cut chips are guided by the cutting edges into a narrow space where the chips are accumulated and can cause clogging to such an extent that the cutting edge often burns off or peels off.

The formation and the pitch of the spiral shape of known shell bits is not suitable for assuring the transporting of the chips outward from the borehole. The known shell bits fill in the entire cross section of the hole, so the transporting of the chips is hindered. Therefore, these known augers are not suitable for continuous operation. The accumulation of chips in the borehole can be eliminated in the case of known auger bits only by lifting the drill out of the borehole several times during drilling, therefore the drilling efficiency is very low.

DESCRIPTION OF THE INVENTION

The aim of this invention is to produce an industrial auger bit for wood in which the cutting edges are always easily available for drilling due to the structural features of the auger bit which can be maintained by grinding, the auger guiding the chips continuously outwardly from the borehole without the risk of accumulation and clogging. Therefore the auger bit is suitable for producing deep holes and grooves during continuous operation.

The present invention fulfills this aim by providing an industrially useful auger bit, which has concave curved chip guiding surfaces when viewed from the direction of the shank and a chip lifting spiral is formed on the shank as the continuation of the chip leading surfaces.

As used throughout the specification and the claims the term "wood" is intended to denote wood as well as other like materials such as plastics and leather, in which an auger bit can be used, as will be readily appreciated by a person having average skill in the art.

A further characteristic of the present invention is that the shank side part of the chip guiding surface fits essentially to the top surface of the cutting body along the central curved line which is parallel to the cutting edge.

The chip lifting spiral or double spiral is suitably made from the material of the bore rod and is suitably integral therewith. The chip lifting spiral can be spring steel with a triangular or parallelogram cross section.

The shank of the auger bit is suitably formed as a Morse cone with the cutting head separably attached to it, which attachment has a spiral or double spiral on its exterior surface and which can be fixed to the drill shank. In this suitable embodiment the shank is attached by right hand thread to the cutting body.

Suitably a truncated cone surface is formed with a threaded boss which protrudes from the top of the cutting body, and is adapted to penetrate a complementarily formed at least partly threaded cavity within the shank.

DESCRIPTION OF THE DRAWING

Embodiments of the present invention are described further with reference being had to the drawing, wherein.

DESCRIPTION OF A SUITABLE EMBODIMENT

Figure 1:
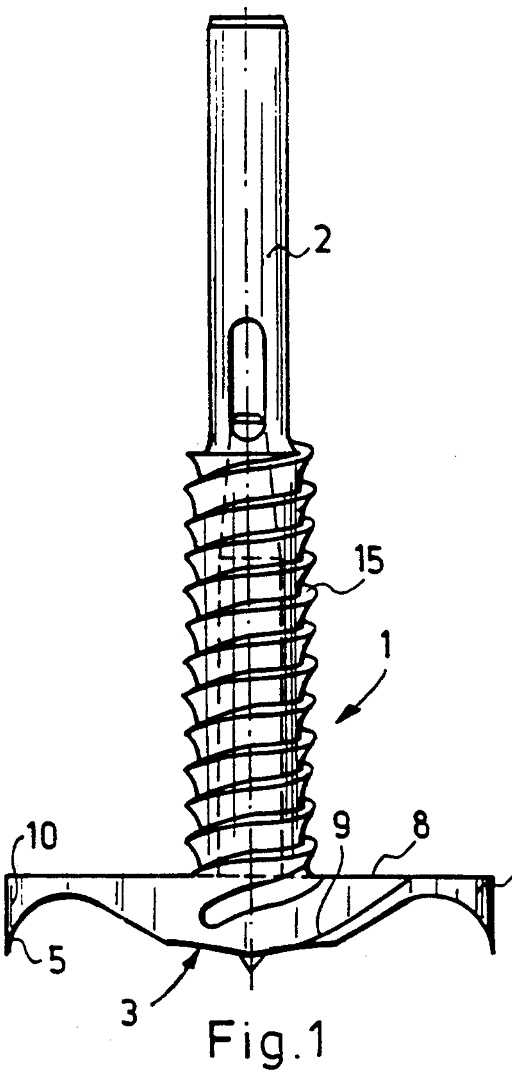
FIG. 1 is a side elevational view of the auger bit of the present invention.
Figure 2:
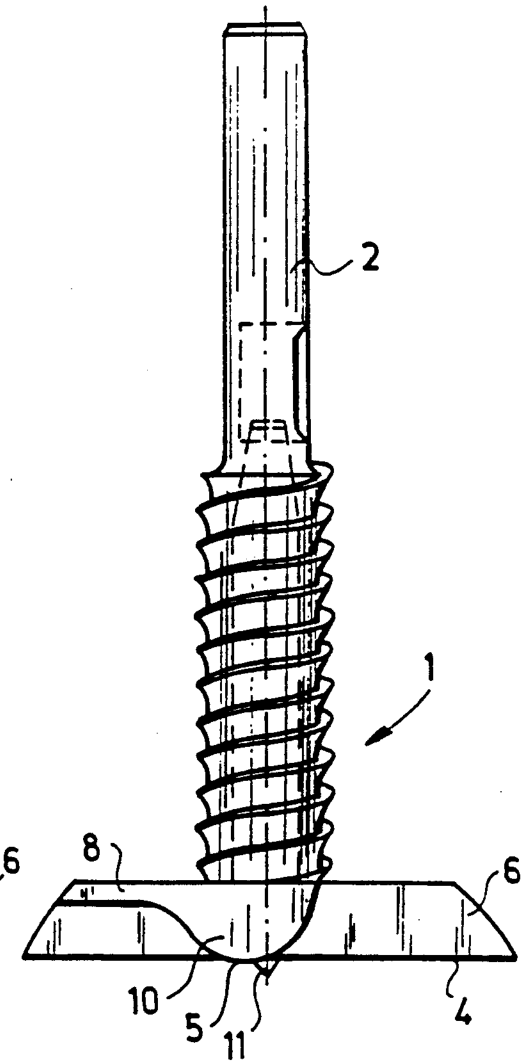
FIG. 2 is a side elevational view of the auger bit of FIG. 1 turned by 90°.
Figure 3:
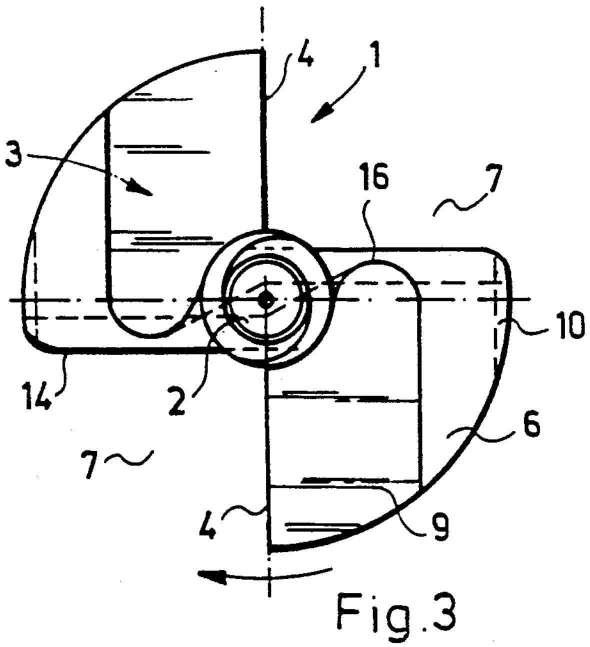
FIG. 3 is a top elevational view of the cutting body of the auger bit of FIG. 1.
Figure 4:
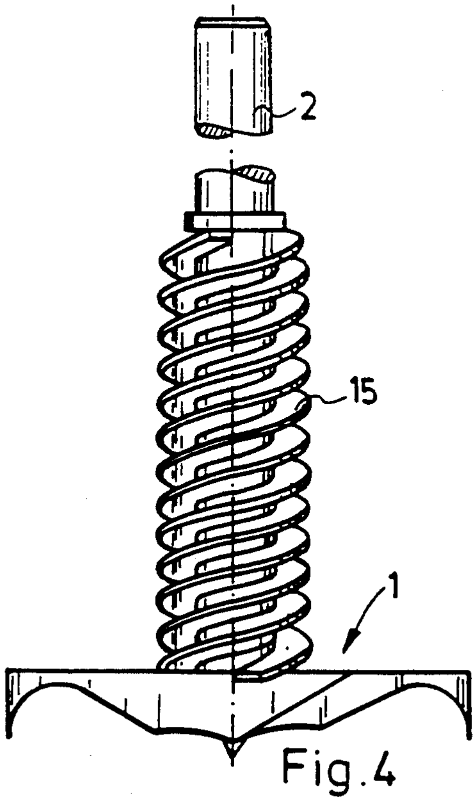
FIG. 4 is a schematic side view of the shank having a chip lifting double spiral with a parallelogram cross section.
Figure 5:
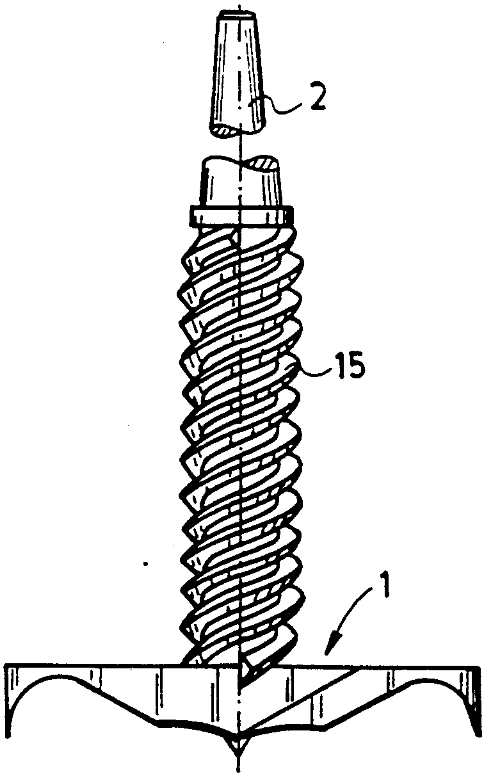
FIG. 5 is a schematic side view of the shank having a chip lifting double spiral with a triangular cross section.
Figure 6:
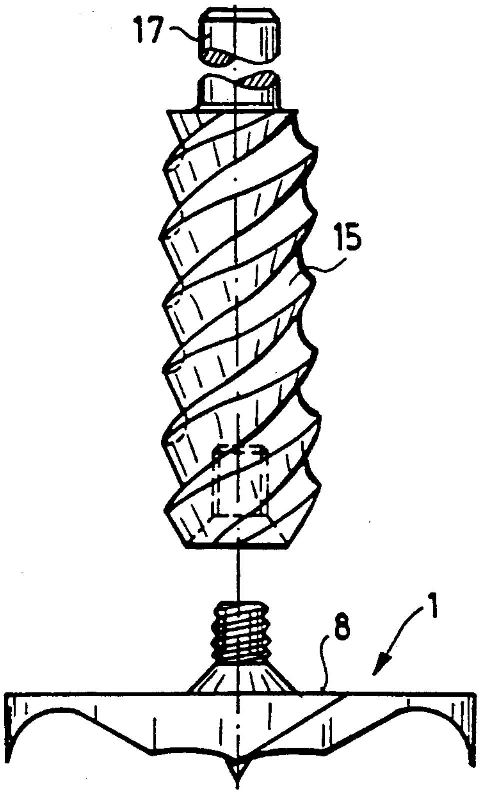
FIG. 6 is an embodiment of a shank that can be attached to the cutting body by a threaded connection.
Figure 7:
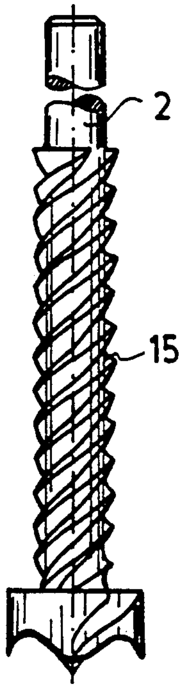
FIG. 7 is a side view of another embodiment of a chip lifting spiral.

The auger bit shown in FIGS. 1–3 has a cutting body 1 and a cylindrical or conical shank 2 which is attached to the cutting body. On the bottom surface 3 of the cutting body 1 there are provided peripheral cutting edges 5 and radial cutting edges 4. For example, the radial cutting edges 4 are situated on the bottom surface 3 of the cutting body 1 in a single, diametric line and they divide the cutting body 1 in two equal parts 6 which are formed on two sides of radial cutting edges 4 turned by 180° relative to one another. The bottom surface 3 is perpendicular to the rotational axis of the cutting body 1.

Seen in the direction of rotation there are two open areas 7 each of about one quarter of the area of the bottom surface 3, to secure the continuous leading out and the automatic elimination of the chips. The open areas 7 enable the removal of the chips formed during cutting, regardless of their amount, to leave the area of the radial cutting edges 4. The chips are pushed outwardly of the area of the radial cutting edges 4 by the chips which are continuously cut. Behind each radial cutting edge 4 there is chip leading surface 9 which rises continuously up to the top surface 8 of the cutting body 1.

A protruding central locator tip 11 is formed in the center of the bottom surface 3 of the cutting body. In a suitable embodiment of the auger bit of the present invention the two radial cutting edges 4 which machine the bottom of the hole, are separated from one another by the central locator tip 11. A side 14 in the filled section of the cutting body, disposed opposite to the other side thereof which is the radial cutting edge 4, is undermachined in a manner marked by dotted lines in FIG. 3.

The undermachining along the side 14 enables the radial cutting edges 4 approaching as much as possible the centerline of the auger thus to enable formation of a hole bottom that is as smooth as possible.

The traditional auger bits have a narrowing cross section as a result of undermachining of the side 14 along a straight line and that narrowing cross section results in a thickening of the chips being formed. In the case of the present invention the chip leading surface 9 is formed so that the chip leading surface 9 which approaches the top surface 8 arcs toward the base of the shank along a mildly curved line 16. This insures formation of a continuous, failure free chip stream.

The single or double spiral 15 formed as a continuation of the arcuate chip leading surface 9 which fits to the base of shank 2, promotes further elimination of the chips from the borehole. The single or double spiral 15 can be suitably made of the same material and integrally with the shank 2, and can also be of spring steel with a triangular or parallelogram cross section.

The spring steel spiral can be fastened onto the bore rod 2 of the cutting tool or on the drilling annex 17 in a manner known per se.

The spiral or double spiral 15 can also be formed on a separate shank 17 which is attachable to the cutting head and which can be clamped in the chunk of a drill. The shank attachment 17 to the auger bit can be formed as Morse cone or threaded shank. When it is formed as spiral covered shank on then a frustoconical threaded boss is formed on the top surface 8 of the cutting body 1 for disposition in a mating cavity in the base of the shank.

The most important advantageous characteristics of the auger bit of the present invention include:

the forming of the chip leading surface enables the continuous removal of the chips;

the spiral or double spiral which has a smaller diameter than that of the borehole continuously loosen the chips as they are compacted by the formation of additional chips and enables the drilling of deep holes and grooves without lifting the auger;

a separate exterior spiral surface drilling attachment can be used also for different cutting body. In this case a single shank can be used with a plurality of cutting bodies;

by the help of the auger bit of this invention wood, plastic and even leather can be worked especially.

I claim:

1. An auger bit, which comprises a cutting body having a concave chip guiding surface, a shank having a chip lifting spiral or chip lifting double spiral on its surface substantially as a continuation of said chip guiding surface and a diameter that is substantially smaller than the diameter of said cutting body, said cutting body being substantially concentric with said shank.

2. The auger bit of claim 1, wherein the cutting body has a top and a bottom surface with the top surface being adjacent to the base of said shank, said cutting body being provided with a radial cutting edge terminating in a curved line on the bottom of said cutting body, said curved line being disposed parallel to said radial cutting edge.

3. The auger bit of claim 1, wherein either of said spirals is of the same material as said shank.

4. The auger bit of claim 1, wherein either of said spirals is of spring steel, and either of said spirals has a triangular or parallelogram cross-section.

5. The auger bit of claim 1, wherein said shank is separate from said cutting body and has the shape of a Morse cone, said cone having said spiral or a double spiral on its surface.

6. The auger bit of claim 5, wherein said separate shank is fastened to said cutting body with a right hand thread, said separate shank being adapted to be held within the jaws of a chuck of a drill.

7. The auger bit of claim 6, further comprising a conical boss attached to or integral with the top of said cutting body and being concentrically disposed therewith, and a threaded shaft being attached to or integral with said conical boss, and a mating conical bore and threaded bore disposed concentrically within the adjoining end of said separate shank, for concentrically attaching said cutting body to said shank.

* * * * *